US012006935B2

(12) United States Patent
Candries et al.

(10) Patent No.: US 12,006,935 B2
(45) Date of Patent: Jun. 11, 2024

(54) PUMP SPEED CONTROLLING METHOD AND APPARATUS, A COMPUTER PROGRAM AND A COMPUTER READABLE MEDIUM HAVING STORED THEREON THE COMPUTER PROGRAM APPLIED THEREBY AND A PUMP

(71) Applicant: Atlas Copco Airpower N.V., Antwerp (BE)

(72) Inventors: Simon Candries, Antwerp (BE); Yun Shi, Cologne (DE)

(73) Assignee: ATLAS COPCO AIRPOWER N.V., Wilrijk (BE)

( * ) Notice: Subject to any disclaimer, the term of this patent is extended or adjusted under 35 U.S.C. 154(b) by 0 days.

(21) Appl. No.: 17/905,998

(22) PCT Filed: Mar. 9, 2021

(86) PCT No.: PCT/EP2021/055889
§ 371 (c)(1),
(2) Date: Sep. 9, 2022

(87) PCT Pub. No.: WO2021/180703
PCT Pub. Date: Sep. 16, 2021

(65) Prior Publication Data
US 2023/0167824 A1    Jun. 1, 2023

(30) Foreign Application Priority Data
Mar. 10, 2020    (BE) .................................. 2020/5166

(51) Int. Cl.
*F04C 25/02*    (2006.01)
*F04B 35/04*    (2006.01)
(Continued)

(52) U.S. Cl.
CPC .............. *F04C 25/02* (2013.01); *F04B 35/04* (2013.01); *F04B 37/14* (2013.01); *F04B 49/065* (2013.01);
(Continued)

(58) Field of Classification Search
CPC .. F04C 25/02; F04C 2220/10; F04C 2220/12; F04C 28/06; F04C 28/08; F04C 14/06;
(Continued)

(56) References Cited

U.S. PATENT DOCUMENTS 6,088,508 A * 7/2000 Ishibashi ............. F04D 27/0261
388/800
2004/0013531 A1 * 1/2004 Curry .................. F04D 27/0261
417/42
(Continued)

FOREIGN PATENT DOCUMENTS

| EP | 1486673 A1 | 12/2004 | |
| WO | 2015074865 A1 | 5/2015 | |
| WO | WO-2018099710 A1 * | 6/2018 | .............. F04B 35/04 |

OTHER PUBLICATIONS

PCT Notification of Transmittal of the International Search Report and the Written Opinion of the International Searching Authority, or the Declaration and PCT International Search Report dated May 21, 2021 for corresponding PCT application Serial No. PCT/EP2021/055889, 5 pages.
(Continued)

*Primary Examiner* — Mark A Laurenzi
*Assistant Examiner* — Xiaoting Hu
(74) *Attorney, Agent, or Firm* — Theodore M. Magee; Westman, Champlin & Koehler, P.A.

(57) ABSTRACT

Repeated cycles each consist of a pump down phase and a holding phase, wherein a start timepoint of each cycle is the timepoint when a rise in an inlet pressure of the pump is
(Continued)

sufficiently large and the time extending between two consecutive cycle start timepoints is a cycle time. A control method includes determining a start of a next cycle during a present cycle, wherein it is preferable that the present cycle directly precedes the next cycle. The method further includes controlling the pump to accelerate to a maximum allowed speed during the holding phase of the present cycle before the start of the next cycle such that at the start of the next cycle full pump capacity is available.

17 Claims, 6 Drawing Sheets

(51) Int. Cl.
    *F04B 37/14*     (2006.01)
    *F04B 49/06*     (2006.01)
    *F04C 28/06*     (2006.01)
    *F04C 28/08*     (2006.01)
    *F04D 19/04*     (2006.01)
    *F04D 27/00*     (2006.01)
    *F04D 27/02*     (2006.01)

(52) U.S. Cl.
    CPC .............. *F04C 28/06* (2013.01); *F04C 28/08* (2013.01); *F04D 19/04* (2013.01); *F04D 27/001* (2013.01); *F04D 27/004* (2013.01); *F04D 27/0261* (2013.01); *F04B 2203/0209* (2013.01); *F04C 2220/10* (2013.01); *F04C 2270/051* (2013.01); *F04C 2270/23* (2013.01); *F05D 2270/3011* (2013.01)

(58) Field of Classification Search
    CPC .................. F04C 14/08; F04C 2270/05; F04C 2270/051; F04C 2270/23; F04B 37/14; F04B 37/16; F04B 49/02; F04B 49/065; F04B 49/20; F04B 2203/0209; F04B 2207/044; F04B 35/04; F04D 17/168; F04D 19/04; F04D 19/042; F04D 19/044; F04D 19/046; F04D 19/048; F04D 15/0066; F04D 27/001; F04D 27/004; F04D 27/0261; F05D 2270/3011
    See application file for complete search history.

(56) References Cited

U.S. PATENT DOCUMENTS

| | | | | |
|---|---|---|---|---|
| 2005/0163622 | A1* | 7/2005 | Yamamoto | F04B 49/00 417/19 |
| 2013/0317640 | A1* | 11/2013 | Lee | G05D 7/0617 700/282 |
| 2014/0039655 | A1* | 2/2014 | Shelley | H02P 1/04 700/95 |
| 2015/0168264 | A1* | 6/2015 | Proctor | G05B 23/0283 702/183 |
| 2017/0218966 | A1* | 8/2017 | Haylock | F04D 27/004 |
| 2021/0381499 | A1* | 12/2021 | Nahrwold | F04B 49/20 |

OTHER PUBLICATIONS

PCT Written Opinion dated May 21, 2021 for corresponding PCT application Serial No. PCT/EP2021/055889, 9 pages.
British Examination Report dated Dec. 3, 2020 and Search Report dated Dec. 2, 2020 for corresponding British application Serial No. GB2009624.4, 5 pages.

* cited by examiner

PUMP SPEED CONTROLLING METHOD AND APPARATUS, A COMPUTER PROGRAM AND A COMPUTER READABLE MEDIUM HAVING STORED THEREON THE COMPUTER PROGRAM APPLIED THEREBY AND A PUMP

CROSS-REFERENCE TO RELATED APPLICATION

This application is a Section 371 National Stage Application of International Application No. PCT/EP2021/055889, filed Mar. 9, 2021, and published as WO 2021/180703 A1 on Sep. 16, 2021, the content of which is hereby incorporated by reference in its entirety and which claims priority of Belgian Application No. BE2020/5166, filed Mar. 10, 2020.

FIELD

The invention relates to a method for controlling the speed of a pump, particularly but not exclusively, a Variable Speed Drive (VSD) vacuum pump employed in a cyclic application. Further, the present invention relates to an apparatus carrying out such a pump speed controlling method. Further, the present invention relates to a pump coupled to such a pump speed controlling apparatus.

BACKGROUND

Pumping systems have been widely used in many sectors in the industry, which, however, consumes a great amount of energy due to low energy efficiency. Constant speed pumps, for instance, operate at a constantly high pumping speed only to maintain in the meantime a low capacity of the pump. Besides, in practical application scenarios, it is rare that the requirement of the pump user would stay unchanged during the pumping process. Thus, pumps driven by VSD have come in to play since it is possible to slow down the pump while maintaining a satisfactory performance of the pumping system resulting in energy saving.

VSD vacuum pumps, for instance, are employed in applications which require repeated cyclic operations of the pumping system. Such a cyclic application usually consists of two phases, namely a pump down phase and a holding phase. In the pump down phase the pump keeps operating at a maximum speed such that the pressure in the vacuum chamber is decreased to a desired target pressure, after which the pump speed is lowered to maintain the desired target pressure. Hence, the energy consumption in the pump down phase is maximum and the time required for pumping down to the desired target pressure is already the best that the pump can deliver. In the holding phase, VSD pumps are either kept at the maximum speed leading to waste of energy but best pumpdown for the next cycles, or slowed down leading to energy savings, but then the acceleration will take time as will be described below. Hence, it is possible that, in the holding phase, the pumping system consumes a much lower amount of energy due to lowered speed without prejudicing the maintenance of the target pressure such that energy efficiency is increased and pumping performance is maintained at the same time.

Therefore, there still exist performance loss and energy waste considering transitions between consecutive cycles involved in the above-mentioned cyclic operations. To be more specific, a pump operating at the lowest speed in the holding phase would have to, at the point of time when the next cycle starts, accelerate in order to get to the maximum speed which is required for the pump down phase in the next cycle. Therefore, the pumping system would have to wait for the delay due to acceleration of the pump from the lowest speed to the maximum speed. Because of this acceleration there is no energy wasted, but the complete pumpdown time increases. Longer pumpdown time means less batches per hour for a customer leading to less throughput.

Thus, problems of pump performance loss as well as energy inefficiency still exist in controlling the speed of a pump.

The discussion above is merely provided for general background information and is not intended to be used as an aid in determining the scope of the claimed subject matter. The claimed subject matter is not limited to implementations that solve any or all disadvantages noted in the background.

SUMMARY

Thus, it is an object of the present invention to provide a pump with speed controlling means capable of higher energy efficiency as well as maintaining required satisfactory pump performance.

The solution to the above-mentioned problem is given by the speed controlling method in accordance to claim 1, the speed controlling apparatus in accordance to claim 12 and the pump in accordance to claim 17.

The method for controlling a speed of a pump in accordance to the present invention applies in particular to a Variable Speed Drive (VSD) vacuum pump employed in a cyclic application. Cyclic applications of the pump usually involve the pump's operating in repeated cycles wherein during each cycle the pump is able to operate at different speeds which is made possible by the VSD. Therefore, the method comprises controlling the pump to operate in repeated cycles and each cycle comprises a pump down phase and a holding phase such that the pump is controlled to repeatedly pump down a volume in a vacuum chamber. For instance, within each cycle, the pump firstly operates at a higher speed so as to keep lowering the pressure and then, after a certain desired target pressure is reached, operates at a lower speed which is enough to hold the desired target pressure. The method analyses the cycle durations based on a rise in inlet pressure. The method takes into account the pumps acceleration time and will calculate what is the best moment in time to accelerate again. This moment in time can be before the rise in pressure, dictating the new cycle. According to the method, the time elapsed between two consecutives cycle starts if then a cycle time.

Further, the method comprises determining, during a present cycle, a start of a next cycle, wherein the present cycle preferably directly precedes the next cycle. Therefore, it is possible with the present method to determine the start of the next cycle which is yet to come, for instance, directly after the present cycle such that better control and calculation of the length of the time involved in at least the holding phase is ensured.

Furthermore, the method comprises controlling the pump to speed up to a maximum speed during the holding phase of the present cycle earlier before the start of the next cycle, which means that the time that would have been wasted in the holding phase of the present cycle is made use of for the acceleration of the pump such that at the start of the next cycle full pump compacity is already available so as to be further and directly applied to the pump down phase of the next cycle.

It is thus the advantage of the present invention that the acceleration delay that would have happened at the beginning of each pump down phase is avoided by accelerating the pump in advance and more specifically at the end of the holding phase in the directly preceding cycle such that the energy that would have been wasted during this holding phase is saved as well. In other words, energy efficiency of the whole pumping system is increased by using the end of each holding phase to accelerate the pump and performance loss incurred during the pump down phase is also decreased since the acceleration delay is rid of.

Preferably, in the pump down phase, the pump is controlled to operate at a maximum speed such that a volume in the vacuum chamber is pumped down from a high pressure to a setpoint or target pressure. The maximum allowed speed of the pump is preferably a function of the inlet pressure of the pump, the motor current of the pump and the oil temperature. Therefore, the maximum allowed speed is a parameter intrinsic of the functioning requirement of the pumping system. In this case, it is ensured that the pump is controlled to pump down the volume as fast as possible in order to deliver the best pump down time which, however, inevitably involves a maximum amount of energy consumption.

Preferably, in the holding phase, the pump is controlled to gradually slow down to a lowest or minimum speed such that the above-mentioned setpoint pressure is maintained ensuring the general performance of the pumping system. Therefore, the energy efficiency is already increased since a much lower speed is required for the holding phase to keep the setpoint pressure without jeopardizing the performance of the pump.

More preferably, in the holding phase, the speed of the pump is controlled to decrease on the basis of the inlet pressure of the pump and the setpoint pressure. Thus, it is preferable that the pump speed is linearly decreased over the pump pressure following a function which is determined by the inlet pressure and the setpoint pressure and preferably by further taking into consideration the cycle time of the ongoing cycle, namely the time length between the start of the present cycle and the start of the next cycle.

Preferably, the method further comprises detecting the start of each cycle upon detecting that the inlet pressure reaches a preset threshold. The preset threshold of the inlet pressure is preferably larger than the setpoint pressure and smaller than the highest inlet pressure during the repeated cycles.

Preferably, when determining, during a present cycle, the start of the next cycle, a Bayesian Filter, in particular a Kalman Filter, is applied such that the start of the next cycle is estimated on the basis of the start of at least one previous cycle that is preferably directly preceding the next cycle. In other words, given the start of at least one previous cycle preceding the next cycle, the method comprises estimating the start of the next cycle that is yet to come using the information contained in the start timepoint of the at least one previous cycle. Such an estimation is achievable by a Bayesian Filter and particularly a Kalman Filter.

Preferably, the inlet pressure of the pump is estimated by implementing a Kalman Filter on the derivative of the inlet pressure, wherein the derivation of the inlet pressure is preferably carried out over time. The outcome of Kalman filtering is then monitored over time so as to be compared to the above-mentioned preset threshold of the inlet pressure to decide whether a new cycle starts. More specifically, it is preferred that the real-time value of the inlet pressure is monitored by Kalman filtering such that the start of a new cycle, namely the next cycle preferably directly following the present cycle, can be detected once the preset threshold is reached by the estimation of the inlet pressure. In addition, not only the derivative of the inlet pressure can be estimated by the Kalman filter but also the inlet pressure itself can be estimated as long as either the rise in the inlet pressure or the absolute value of the inlet pressure can be estimated for the determination of the start of a new cycle. Therefore, the present invention does not intend to be limiting in the selection of the parameter that is being estimated using a Bayesian Filter and particularly a Kalman Filter.

More specifically, the estimation of the inlet pressure is based on predicting, a priori, the derivative over time of the inlet pressure in the next cycle on the basis of an estimation of the derivative over time of the inlet pressure in the at least one previous cycle preferably directly preceding the next cycle; and updating, a posteriori, the derivative over time of the inlet pressure in the next cycle on the basis of the a priori prediction of the derivative over time of the inlet pressure in the next cycle and an observation of the derivative over time of the inlet pressure in the present cycle. In other words, given the information of the estimated values of the derivative over time of the inlet pressure in at least one previous cycle preceding the next cycle, namely the cycle whose information is to be estimated, the a priori information of the next cycle is predicted; and this predicted value needs to be further updated taking into consideration the observed value which can be measured by the controlling method in the present cycle. Therefore, the estimation of the inlet pressure in each cycle is a combined result obtained from the estimations of at least one previous cycle as well as the observed or measured value obtained in the present cycle such that accuracy of estimation is ensured. As already mentioned above, the selection of the specific parameter being estimated by Kalman filtering is not limited to the derivative of the inlet pressure. Further, preferably the number of previous cycles being considered is at least one, but more preferably two or three, and may be more than three depending on the requirement of estimation accuracy and algorithm complexity.

Preferably, the method further comprises estimating a pre-speeding time of the next cycle. It is necessary to estimate the timepoint during the next cycle at which the pump needs to be controlled to speed up such that at the start of the next cycle the pump is already at its full capacity. It is noted that, since the start of a cycle can be determined when the preset threshold is reached, the full capacity of the pump is then considered achieved upon reaching the preset threshold of the inlet pressure. Therefore, the pre-speeding time related to the next cycle is referred to the length of time since the start of the next cycle until the timepoint in the holding phase of the next cycle when the pump is controlled to speed up. Depending on the specific application scenario, the start of the next cycle can either be fixed or estimated as described above, and given the estimation of the pre-speeding time of the next cycle it is possible to control the pump to speed up to its maximum speed in advance in the holding phase at a timepoint when the estimated pre-speeding time expires. Further, the estimation is implemented by a Bayesian Filter and particularly a Kalman Filter on the basis of the pre-speeding time of at least one previous cycle that is preferably directly preceding the next cycle. The number of previous cycles being considered is more preferably two or three and the at least one previous cycle does not have to be directly preceding the next cycle whose information is to be estimated.

Preferably, by a weighted average of an estimation of the pre-speeding time of at least one previous cycle preferably directly preceding the next cycle and an observation of the pre-speeding time of the present cycle, the estimation of the pre-speeding time of the next cycle is obtained. It is advantageous to combine the previously estimated information and the presently measured observation so as to obtain a better balance regarding the estimation of the information regarding the next cycle.

Preferably, the following iterative learning formula is applied to estimate the pre-speeding time of the next cycle, $$u_{j+1} = \frac{a}{a+b+c+d} * u_j + \frac{b}{a+b+c+d} * u_{j-1} + \frac{c}{a+b+c+d} * u_{j-2} + \frac{d}{a+b+c+d} * \left( CycleTime_j - \frac{\text{Max Speed} - \text{Min Speed}}{\text{Acceleration}} - \text{offset} \right),$$

wherein:
j=the iteration index for the present cycle,
u=the estimation of the pre-speeding time,
a=weighting factor,
b=weighting factor,
c=weighting factor,
d=weighting factor,
CycleTime=the observation of the cycle time,
Acceleration=the acceleration constant in revolution per minute per second, rpm/s, used in a VSD inverter, and
offset=offset parameter to increase stability.

Further, although the estimation of three previous cycles is applied in the above-mentioned iterative learning formula, only one or two or more than three previous cycles can be applied to the formula as well depending on the specific requirement of the estimation accuracy as well as algorithm complexity, which naturally results in the change of the number of weighting factors used in the formula. In addition, the weighting factors appear in the above-mentioned formula as fixed parameters, which, however, can also be estimated for each cycle by using a Bayesian or Kalman filter accordingly. Besides, the offset parameter is applied to increase stability of the above-mentioned iterative learning algorithm. Therefore, this offset parameter is either a fixed value for a specific application scenario or a value that can be selected by carrying out several tests of the above-mentioned formula before applying it. As the above-mentioned formula suggests, the selection of the offset is dependent on the difference between the estimation of the pre-speeding time of any previous cycle as mentioned above and the value obtained after subtracting from the observation of cycle time further the time needed for the pump to accelerate from its minimum or lowest speed to its maximum speed.

Preferably, when the above-mentioned controlling method runs for the first time, the pump is controlled to operate at first at the maximum speed for at least one cycle such that the start timepoint and/or the pre-speeding time of the at least one cycle is obtained, wherein number of cycles during which the pump is controlled to operate at a maximum speed depends on the number of previous cycles to be considered for the estimation as explained above. That is, the pump is controlled to operate at a maximum speed as long as enough values of the iteration items which are suitable to be used for the first estimation are obtained.

The apparatus controlling the speed of a pump in accordance to the present invention applies particularly to a VSD vacuum pump employed in a cyclic application. The apparatus comprises a memory unit wherein instructions in respect of the steps of the method as mentioned above are stored and wherein preferably parameter which are either fixed or updated during the estimation as mentioned above are stored. For instance, a first sub-memory unit comprising the iteration index as well as the estimation of the pre-speeding time and the cycle time of at least one previous cycle is preferably provided. A second sub-memory unit is applied to store the fixed values of the parameters such as the weighting factors, the acceleration, the maximum speed as well as lowest speed of the pump and the offset parameter. The speed controlling apparatus further comprises a processing unit configured to execute the instructions comprised in the memory unit; an output unit configured to transmit speed controlling signals to the pump; and an input unit configured to read and feed the inlet pressure of the pump to the processing unit.

Preferably, the apparatus comprises a time counting unit configured to calculate the start time point and/or the pre-speeding time of at least one cycle when the processing unit starts executing the instructions for the first time.

Preferably, the time counting unit is further configured to measure the start time point and/or the cycle time of the present cycle. Thus, during the present cycle, the estimation of the next cycle takes into consideration the actual value measured in the present cycle resulting in a higher accuracy and a better balance of the outcome of the estimation carried out in the present cycle.

A computer program in accordance to the present invention is also provided comprising instructions to cause the speed controlling apparatus as mentioned above to execute the steps of the method as mentioned above.

A computer readable medium in accordance to the present invention is provided as well wherein the above-mentioned computer program is stored.

The pump in accordance to the present invention is particularly a VSD vacuum pump employed in acyclic application which pump is coupled to the apparatus controlling its speed as mentioned above. Therein, the vacuum pump can be a Dry Claw pump, Root pump, Scroll pump or a Rotary Screw pump to which variable speed drive can be coupled so as to adapt to specific application requirements. Further, the vacuum pump might be a displacement pump such as a diaphragm pump, a gas or vapor displacement pump and a piston pump. Further, the vacuum pump might as well be a velocity pump such as an inertia pump. The pump comprises a control unit configured to detect a plurality of pump parameters, wherein preferably a plurality of sensors is provided in the pump for the detection of the parameters by the control unit. The pump further comprises an output unit configured to transmit the plurality of pump parameters to the speed controlling apparatus that is coupled to the pump. Further, an input unit is comprised in the pump for the receiving of the speed controlling signals transmitted from the speed controlling apparatus such that the pump is controlled to operate according to the steps of the method as mentioned above. The communication between the input/output units of the pump and the speed controlling apparatus can be implemented through electrical wires if the pumping system and the speed controlling apparatus are required to be physically located on one site. However, the speeding controlling apparatus may also be positioned in another site different from the pump in which case wireless communication is applied between the speed controlling apparatus and the pump. In addition, its is also possible that a central controlling apparatus is provided at another site which relays or controls the signal transmission between the pump and the speed controlling apparatus such that several pumps on different sites may be controlled simultaneously. Thus, both centralized/decentralized and local/networked arrangement of the pumping controlling system can be realized according to the present invention.

Preferably, at least the inlet pressure of the pump is comprised in the plurality of pump parameters which are transmitted from the control unit of the pump to the pump speed controlling apparatus or the controlling center located locally or distantly to the pump site.

Therefore, compared with conventional pumps without variable speed drive or pumps with variable speed drive but without specific speed controlling of the pump during each cycle when applied to a cyclic application in the industry, the present invention is advantageous in that each repeated cycle during the application of the pump is divided into two phase, namely a pump down phase and a holding phase; in the pump down phase the pump is controlled to pump down a volume as fast as possible by operating at the maximum speed so as to deliver the best pump down time performance; in the holding phase the pump is controlled to already start accelerating to its full capacity making use of the energy during this holding phase to compensate for the acceleration delay which would otherwise occur at the beginning of the pump down phase of the next cycle; and making use of Bayesian Filtering and more particularly Kalman filtering to accurately estimate a start timepoint of each cycle as well as the time length between the start of the cycle and the timepoint at which the pump is controlled to speed up during the holding phase of the cycle by considering the estimation information obtained for the previous cycles as well as the observation information obtained during the present cycle. Hence, the speed of the pump is continuously adapted to the real-time operation conditions of the pump resulting in avoiding energy waste during the holding phase and avoiding loss of pump performance during the pump down phase.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following disclosure references will be made to the drawings, in which.

DETAILED DESCRIPTION

Figure 1:
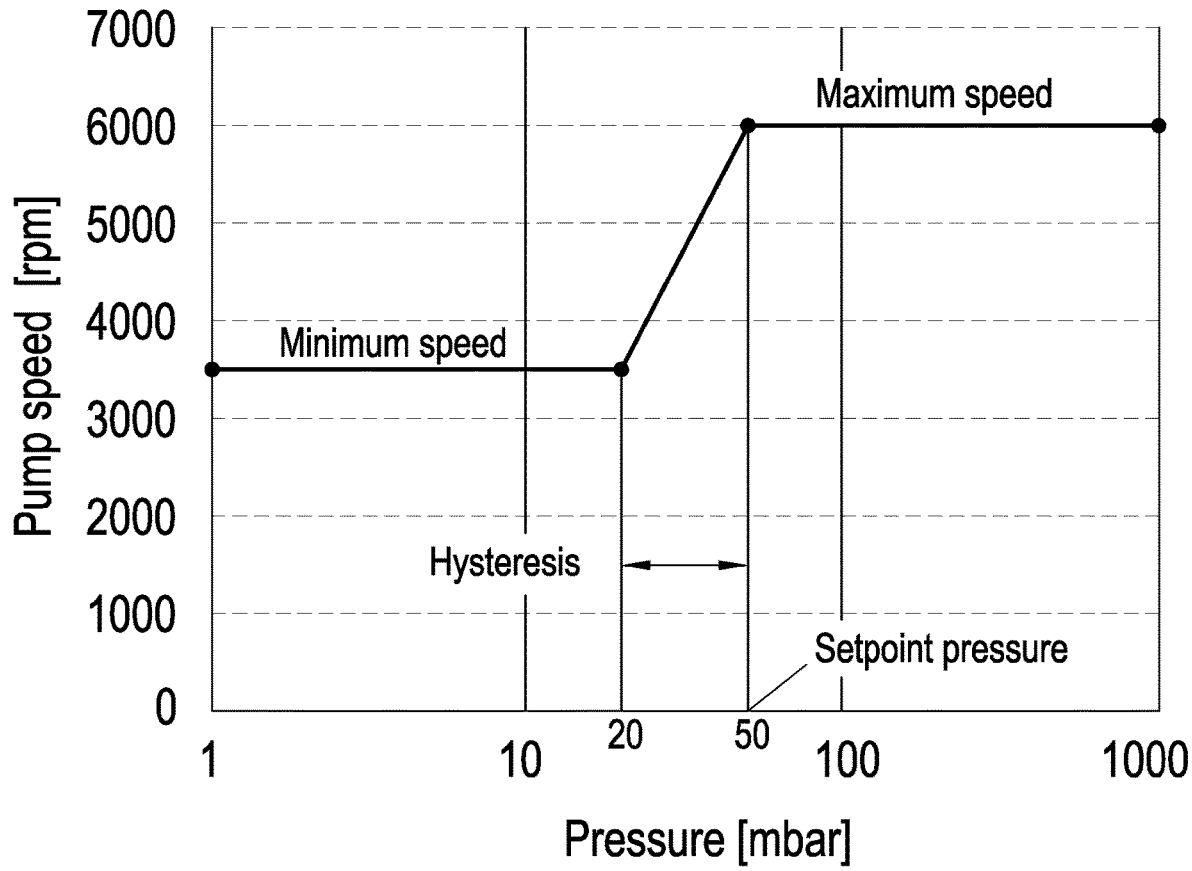
FIG. 1 is a graph illustrating a relationship between pump speed and pressure.

FIG. 1 illustrates a relationship between pump speed and pressure, wherein the maximum speed of the pump is shown as 6000 revolution per minute (rpm), the minimum speed of the pump 3500 rpm, the setpoint pressure or the desired target pressure 50 millibar (mbar) and the hysteresis is shown to extend over 30 mbar. According to FIG. 1, the pump pressure starts at a value as high as 1000 mbar whereas in the meantime the pump operates at the maximum speed such that the pressure is pumped down continuously. At the point of time when the setpoint pressure 50 mbar is reached, the pump gradually slows down which results in a hysteresis region during which the pressure gradually decreases as well until it reaches 20 mbar. After that, the pump operates at the minimum speed which gives rise to further reduction of the pressure. A significant amount of energy is saved since at the later stage after the setpoint pressure of the pump is met, the pump operates at a much lower speed while still maintaining a satisfactory performance of the pump pressure.

Figure 2:
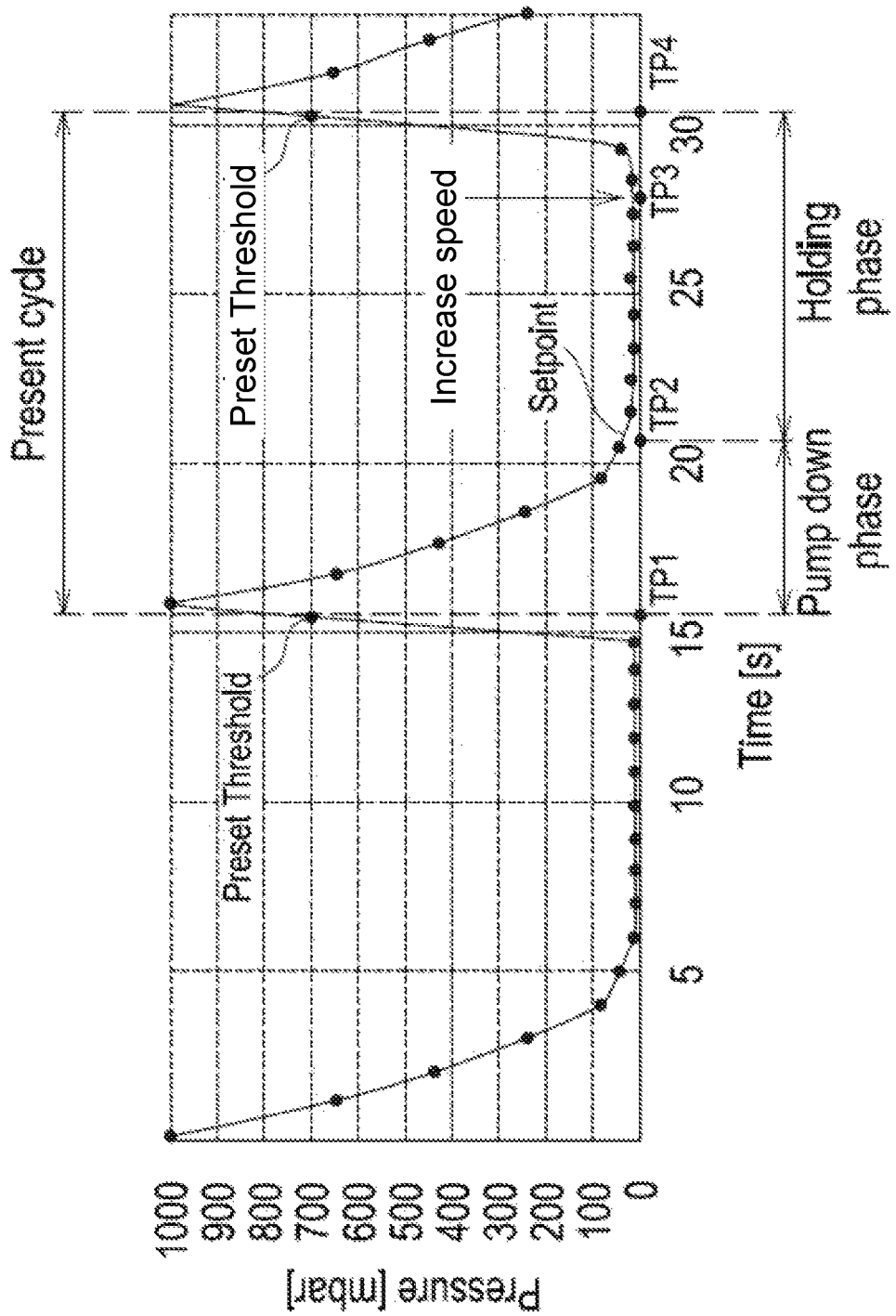
FIG. 2 is a graph illustrating starts of repeated cycles each comprising a pump down phase and a holding phase as well as acceleration of the pump during the holding phase.

Referring to FIG. 2, a detailed representation of repeated cycles each comprising a pump down phase and a holding phase is presented, wherein the starts of the repeated cycles as well as the timepoint in the holding phase when the pump is controlled to accelerate are also shown. In FIG. 2, the present cycle extends between the start of the present cycle and the start of the next cycle, wherein the present cycle starts at a timepoint 1, TP1, when the rise in the inlet pressure of the pump is considered sufficiently large, in this case when the inlet pressure reaches 700 mbar, and the start of the next cycle, namely a timepoint 4, TP4, is determined analogously to the present cycle. While it is common practice that the determination of start of cycles relies on a fixed value of either the inlet pressure increment or the absolute value of the inlet pressure, this criterion can also be changed for each cycle during one cyclic application and further can be dependent on specific application scenario. Each cycle depicted in FIG. 2 comprises two phases, namely a pump down phase and a holding phase. The pumping process enters the holding phase at a timepoint 2, TP2, when the setpoint pressure, in this case 50 mbar is reached (the value being the same as that shown in FIG. 1). According to FIG. 2, at a timepoint 3, TP3, the pump is controlled to increase its speed before the start of the next cycle, namely TP4, such that shortly after TP4 the pump full capacity is already available. In other words, by increasing the speed of the pump at the holding phase of the present cycle, the remaining time of the holding phase can be utilized to compensate for the acceleration delay which would otherwise happen after the start of the next cycle resulting in performance loss of the pumping system. According to the present invention, the start of the next cycle is determined during the present cycle in a manner analogous to the determination of the start of the present cycle.

Although not directly depicted in FIG. 2, it is preferable that during the pump down phase of each cycle, the pump is controlled to operate at the maximum speed in order to pump down the volume from a high pressure to the setpoint pressure, wherein in the case of FIG. 2 the high pressure is shown as 1000 mbar and the setpoint pressure is shown as 50 mbar. It is in addition preferable that during the holding phase of each cycle, the pressure is gradually decreased with a much slower rate compared with the pump down phase. As illustrated in FIG. 2, the pump pressure gradually approaches 0 mbar during the holding phase of the present cycle. According to the present invention, it is even more preferable that the speed of the pump during the holding phase is controlled to decrease on the basis of the inlet pressure and the setpoint pressure in order to achieve a better control of the holding phase.

It is thus evident at least according to FIG. 2 that the predetermination of the timepoint when the pump is to accelerate during the holding phase of the present cycle as well as the determination of the start of the next cycle ensures that an significant amount of time is reserved for the pump to accelerate to its full capacity at the start of the next cycle.

Figure 3:
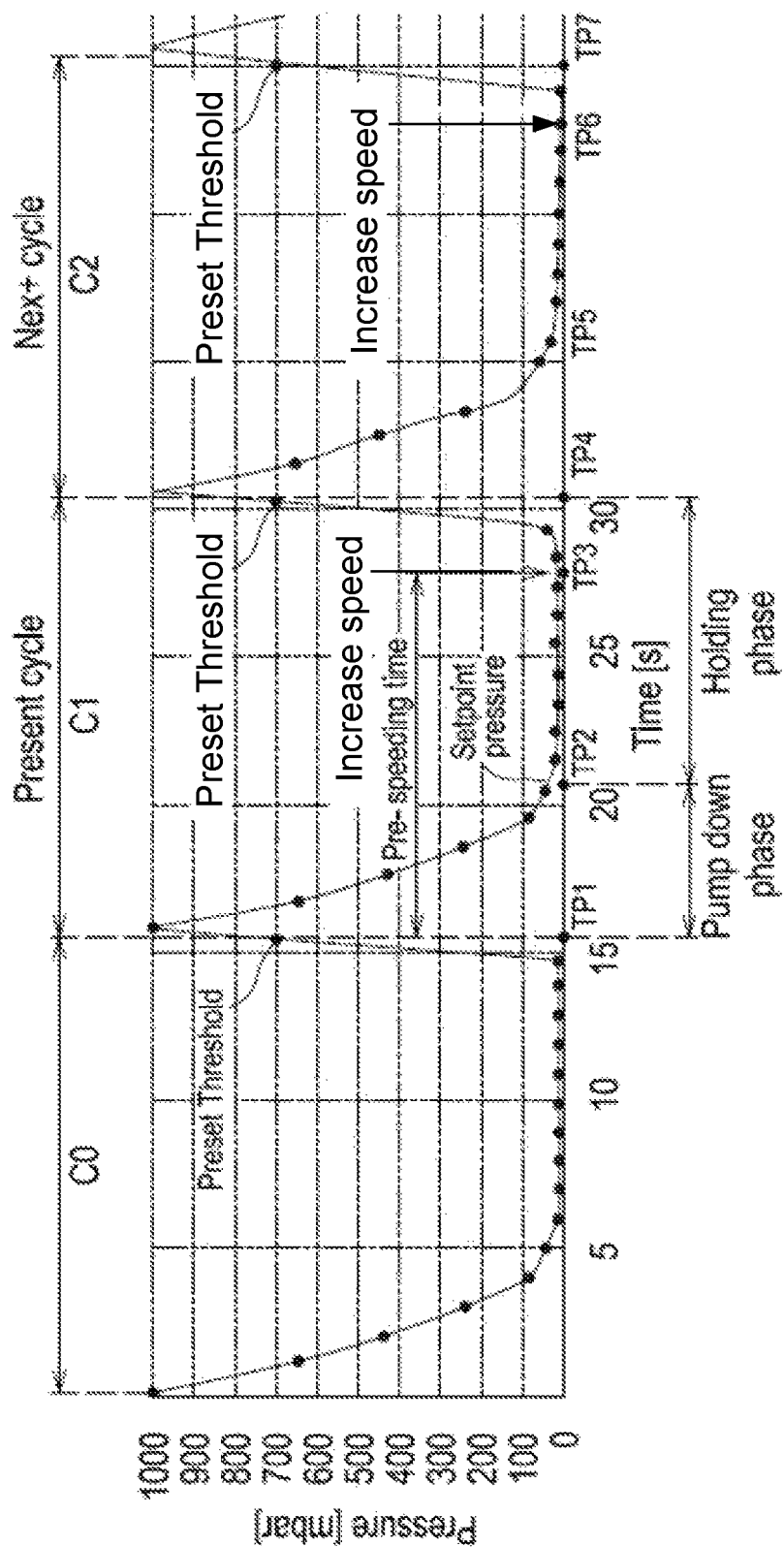
FIG. 3 is a graph illustrating estimation of a start of a next cycle as well as estimation of the timepoint of acceleration of the pump during the next cycle.

Referring to FIG. 3, a more detailed graph illustrating the estimation of cycle starts and timepoints for the pump to accelerate is presented, wherein the whole pumping procedure during each cycle is similar to what has been described for FIG. 2. According to FIG. 3, the next cycle C2 starts at the timepoint TP4 which is determined, according to the present invention, on the basis of the start timepoint of at least one previous cycle which in the present case refers to at least one of the cycles C1, C0 and cycles before C0 that precede the next cycle C2. It is preferable that the estimation of the cycle start of C2 is implemented by a Bayesian filter and more particularly and preferably a Kalman filter. Analogously, the start of the cycle following the next cycle C2, namely C3 (not completely shown in FIG. 3), is determined using at least one previous cycle preceding C3. Thus, the estimation of the cycle start is to be carried out repeatedly for any new cycle using information from the previous cycles preceding the new cycle. However, depending on the application scenario and requirements, the cyclic estimation may be implemented for only some cycles during the whole pumping procedure.

According to the present invention as illustrated in FIG. 3, the timepoint TP4 is estimated by applying a Kalman filter preferably on the derivative overtime of the inlet pressure. More specifically, during the present cycle C1, the information of the start of cycles C1, C0 and cycles before C0 is already at hand wherein information of at least one of these cycles C1, C0 and cycles before C0 is used to predict the a priori information of TP4; in addition, during the present cycle, the actual value of the derivative over time of the inlet pressure can already be observed and measured which thus is used to further update the predicted information of TP4 resulting in a more accurate a posteriori estimation of TP4.

In summary, each of TP1, TP4 and TP7 (cycle start of C3 at a timepoint 7) is estimated similarly in the above-mentioned manner by using both the previous estimation of the relevant parameter, namely start of cycle, of at least one of the respective previous cycles and the observed or measured information of one of the previous cycles. It is noted that the number of previous cycles applied in obtaining the estimation is at least one and is dependent on the specific application scenario and requirements; and although it appears in FIG. 3 that the observation of cycle start of the present cycle which directly precedes the next cycle is made use of, another or more than one measured or observed values of the relevant parameter can also be applied depending on the application scenario and requirements.

Further according to FIG. 3, it is even more preferable that for each cycle the time length between cycle start and the timepoint when the pump is controlled to accelerate is also estimated. For instance, it is shown in FIG. 3 that during the present cycle C1, a timepoint 3, TP3, is a timepoint when the pump needs to accelerate which has already been determined during carrying out the previous cycles namely cycle C0 and cycles before C0, and analogously for the next cycle C2, a timepoint 6, TP6 is also determined during the previous cycles C1, C0 and cycles before C0. Since the start of each cycle is either a fixed value or estimated as described above according to the present invention, estimation of the pre-speeding time as illustrated in FIG. 3 gives an estimation of the timepoint when the pump needs to be controlled to accelerate. It is preferable, according to the present invention, that the estimation of acceleration timepoint is also conducted by a Bayesian filter and more particularly and preferably a Kalman filter based on the information of at least of the pre-speeding time of the previous cycles C1, C0 and cycles before C0.

In addition to FIG. 3 and according to the present invention, the estimation of the pre-speeding time comprises preferably two steps as well, one being the prediction of the a priori information regarding the pre-speeding time of the next cycle C2 on the basis of the estimation of at least one of the previous cycles C1, C0 and cycles before C0 and the other being the updating of the prediction using the observed or measured information regarding one of the previous cycles C1, C2 and cycles before C0, and wherein it is preferable that the measured information is obtained from the cycle that directly precedes the next cycle C2, namely C1.

According to the present invention, it is preferable that a weighted average of the estimation of the pre-speeding time of at least one of the previous cycles C1, C0 and cycles before C0 as well as the observation of one of the previous cycles C1, C0 and cycles before C0 is applied for the estimation. According to the present invention and more preferably, the weighted average is in the following form of an iterative learning formula, $$u_{j+1} = \frac{a}{a+b+c+d} * u_j + \frac{b}{a+b+c+d} * u_{j-1} + \frac{c}{a+b+c+d} * u_{j-2} + \frac{d}{a+b+c+d} * \left( CycleTime_j - \frac{\text{Max Speed} - \text{Min Speed}}{\text{Acceleration}} - \text{offset} \right),$$

wherein:
j=the iteration index for the present cycle,
u=the estimation of the pre-speeding time,
a=weighting factor,
b=weighting factor,
c=weighting factor,
d=weighting factor,
CycleTime=the observation of the cycle time,
Acceleration=the acceleration constant in revolution per minute per second, rpm/s, used in a VSD inverter, and
offset=offset parameter to increase stability.

In the above-mentioned formula, it is assumed that the present cycle has an iteration index j and three previous cycles, denoted by j, j−1 and j−2 respectively, directly preceding the next cycle, denoted by j+1, are applied. It is also possible to use less than three previous cycles depending on the application scenario and requirement. As shown in the above-mentioned formula, a further balancing term which involves at least the observation of the cycle time of the present cycle is included. Referring to FIG. 3, the observed value of the pre-speeding time equals to the observed value of the cycle time subtracting the time needed by the pump to accelerate from the minimum speed to the preset threshold, which subtraction result might thus be involved in the balancing term. Preferably, due to the preset threshold being sufficiently large and close to the maximum speed of the pump, the balancing term might as an alternative include observation of the cycle time subtracting the time needed for the pump to accelerate from the minimum speed to the maximum speed. It is further preferable to insert an offset parameter into the balancing term to increase stability of the iterative learning algorithm, which offset parameter can either be fixed or adapted during each cycle of the iteration method depending on the application scenario and requirements. Further, the weighting factors a, b, c and d are shown as fixed parameters in the above-mentioned formula, whereas it is also possible, according to the present invention, to update these weighting factors in a manner similar as the pre-speeding time.

Figure 4:
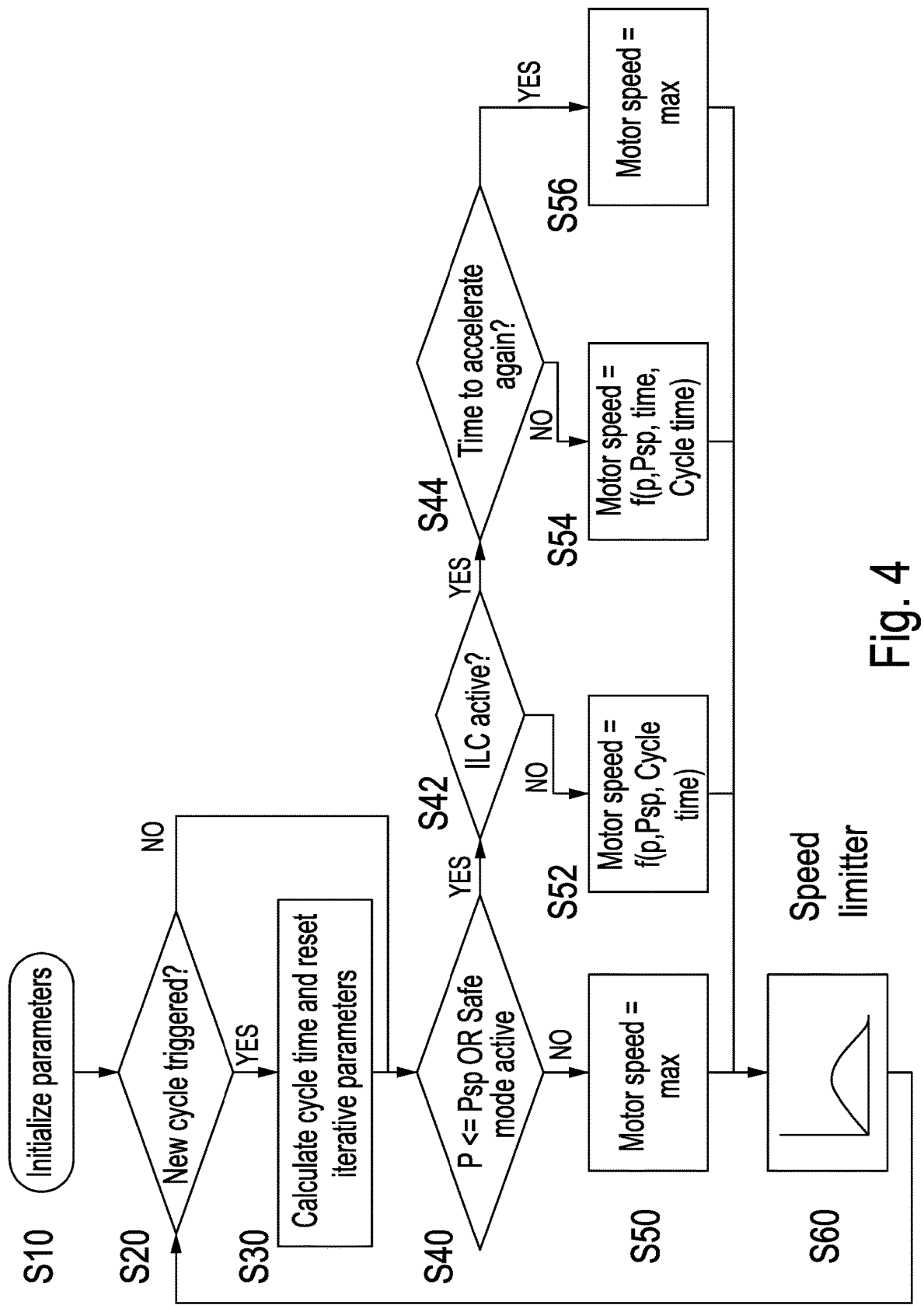
FIG. 4 is a flowchart illustrating an iterative speed controlling process.

FIG. 4 is a flow chart depicting the speed controlling method in accordance with the present invention. Therein, the speed controlling method starts with step 10, S10, for the initialization of parameters. Since the information of at least one previous cycle is to be used for the estimation of the following cycle, it is necessary to initialize the parameters when the speed controlling is activated for the first time. More specifically, a safe mode is entered in which the pump is controlled to run at its maximum speed for a plurality of cycles so as to obtain parameters. For instance, as shown in the above-mentioned iterative learning formula, the pump can be controlled to operate in the safe mode for three cycles based on which the estimation of the fourth cycle can be carried out and further for each cycle after the fourth cycle the estimation can be repeatedly carried out.

At step 20, S20, it is tracked whether a new cycle has started. The criterion used here is either a sufficiently large rise in the inlet pressure of the pump or the absolute value of the inlet pressure reaching a preset threshold according to the present invention. Therefore, the start of any new cycle at this step can be detected simply by comparing the inlet pressure measured at any timepoint to the preset threshold which can either be a fixed value or an unfixed value depending on the application scenario and requirements. Preferably it is also possible to estimate the inlet pressure of a new cycle at this step by, for instance, implementing a Kalman filter as mentioned above. Take the fourth cycle as mentioned above as an example, the derivative over time of the inlet pressure at any timepoint is updated in a real-time manner such that the timepoint, when the estimation result reveals that the inlet pressure is higher than the preset value of the inlet pressure, is determined as the start of the fourth cycle given the previous information of the cycle starts of the first, second and third cycles. If it is confirmed that a new cycle has just started after checking S20, the speed controlling method proceeds to step 30, S30, wherein the cycle time, which is the time between two cycle starts, is then counted such that all iterative parameters are reset. Referring back to the learning control formula as shown above, it is necessary to update, during each iteration, the three items of pre-speeding time used therein, namely $u_j$, $u_{j-1}$ and $u_{j-2}$, as well as the observation of the cycle time, namely $CycleTime_j$. It is also possible to reset, at S30, the parameters of the weighting factors as well as the offset if need be. On the other hand, if after checking S20, it is confirmed that the pump is operating in a condition other than the start of a cycle, the speed controlling method then proceeds to step 40, S40.

At S40, it is checked whether the inlet pressure is not higher than the setpoint pressure, Psp, or whether the pump is operating in a safe mode. If neither of the two criteria is met, then the speed controlling method proceeds to the step 50, S50, wherein the pump is controlled to keep operating at the maximum speed. In other words, the pump is still to operate in the pump down phase wherein the inlet pressure is not yet reduced to the setpoint pressure.

On the other hand, if, at S40, it is determined that the inlet pressure has already reduced to or is lower than the setpoint pressure or that the pump is running in a safe mode. The speed controlling method then proceeds to step 42, S42, in order to check whether the iterative learning control, ILC, is activated for the estimation of the pre-speeding time of the following cycles. Thus, it is possible that at S42, it turns out that the ILC is not activated indicating the conventional operation of the pump which is illustrated by step 52, S52. At S52, the speed of the pump is controlled to slow down on the basis of the inlet pressure as well as the setpoint pressure Psp. It is preferable to take into consideration the time as well as the cycle time for determining the manner in which the speed is to be decreased.

On the other hand, at S42, when it is confirmed that ILC is activated, the speed controlling method then precedes to step 44, S44, at which it is checked if the pre-speeding time has expired which means the pump needs to be controlled to accelerate again. Take the fourth cycle as mentioned above as an example, both of the estimation of the start of the fourth cycle and the pre-speeding time needed in the fourth cycle are already obtained preferably during the third cycle, given preferably the relevant information of the three previous cycles. When the pre-speeding time, which is calculated from the start timepoint of the fourth cycle, expires, it is confirmed at S44 that the speed controlling method can then precede to step 56, S56, wherein the pump is controlled to run at the maximum speed. In other words, after the pre-speeding time expires, the pump is already accelerating in the holding phase of the present cycle before the start of the next cycle which is yet to come.

On the other hand, if it is confirmed at S44 that the pre-speeding time has not yet expired which means the pump only has to continue to be slowed down similar to what is described in S52.

Further, steps S50, S52, S54 and S56 are further proceeded to step 60, S60, to a speed limiter such that the maximum allowed speed of the pumping system is not exceeded.

Figure 5:
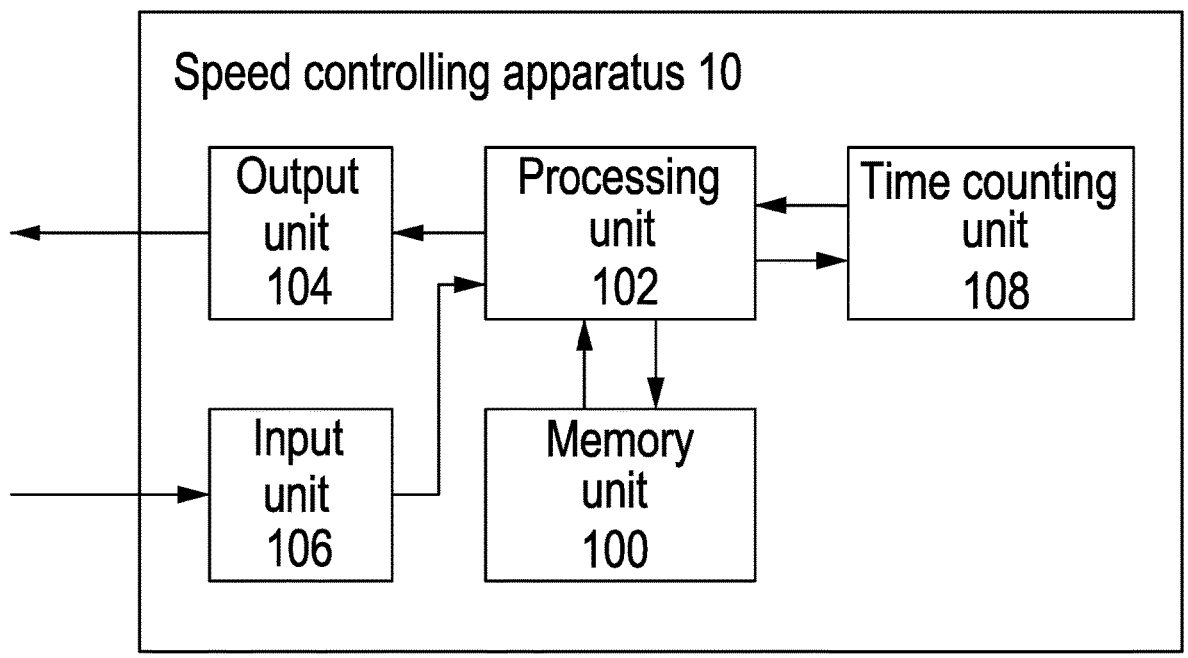
FIG. 5 is a schematic illustration of a speed controlling apparatus.

FIG. 5 illustrates a speed controlling apparatus 10 in accordance with the present invention, wherein the speed controlling apparatus 10 comprises at least a memory unit 100, a processing unit 102, an output unit 104 and an input unit 106. The memory unit 100 comprises at least the instructions in respect of the method steps as mentioned above, which instructions are executed by the processing unit 102. It is also possible that the relevant parameters, including pre-set parameters such as the preset threshold of the inlet pressure, the weighting factors used in the iterative learning control formula, as well as the offset if it is a constant value are stored in a subsection comprised in the memory unit 100. It is thus also possible to have another subsection in the memory unit 100 to store all the iteration indexes and all the relevant parameters which are to change during the iterations including the estimation of the start timepoints of the cycles as well the observation of the cycle time. Further, the maximum speed, the minimum speed and the acceleration of the pump are pump-specific parameters which are fixed depending on the application scenario and requirements and can thus be stored in yet another memory subsection comprised in the memory unit 100. The output unit 104 transmits speed controlling signals given by the speed controlling apparatus 10 to the pump and the parameters including at least the inlet pressure of the pump to be read from the input unit 106.

It is preferred that, as also illustrated in FIG. 5, a time counting unit 108 is comprised in the speed controlling apparatus 10, wherein the time counting unit 108 is specifically configured to mark the timepoint of the start of the cycles as well as to calculate the pre-speeding time of the cycles which are used to keep track of the start timepoints of the cycles as depicted at S30 in FIG. 4 and to count whether the pre-speeding time expires as depicted at S44 in FIG. 4. Further it is preferable that the time counting unit 108 measures the observation of a period of time whenever it is needed as a balancing term in the estimation method, for instance, the observation or measurement of the pre-speeding time of the present cycle.

Figure 6:
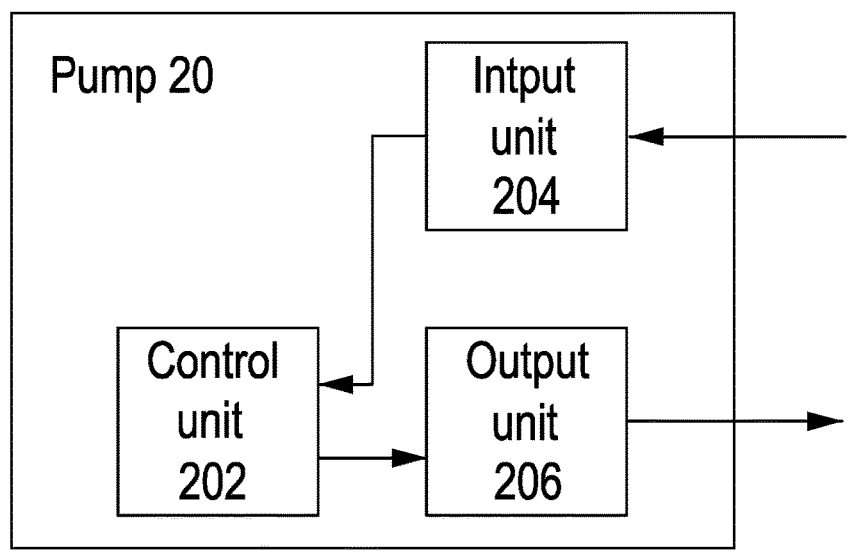
FIG. 6 is a schematic illustration of a pump.

FIG. 6 depicts a pump 20 in accordance with the present invention, which comprises at least a control unit 202, an input unit 204 and an output unit 206. The output unit 206 transmits at least one pump parameters including the pump inlet pressure to the speed controlling apparatus such as the speed controlling apparatus 10 as illustrated in FIG. 5. The input unit 204 is configured to receive the speed controlling signals transmitted from the speed controlling apparatus, such as the speed controlling apparatus 10 illustrated in FIG. 5. It is possible that at least one sensor is also included in the pump 20 so as to obtain the pump parameters required by the control unit 202.

Figure 7:
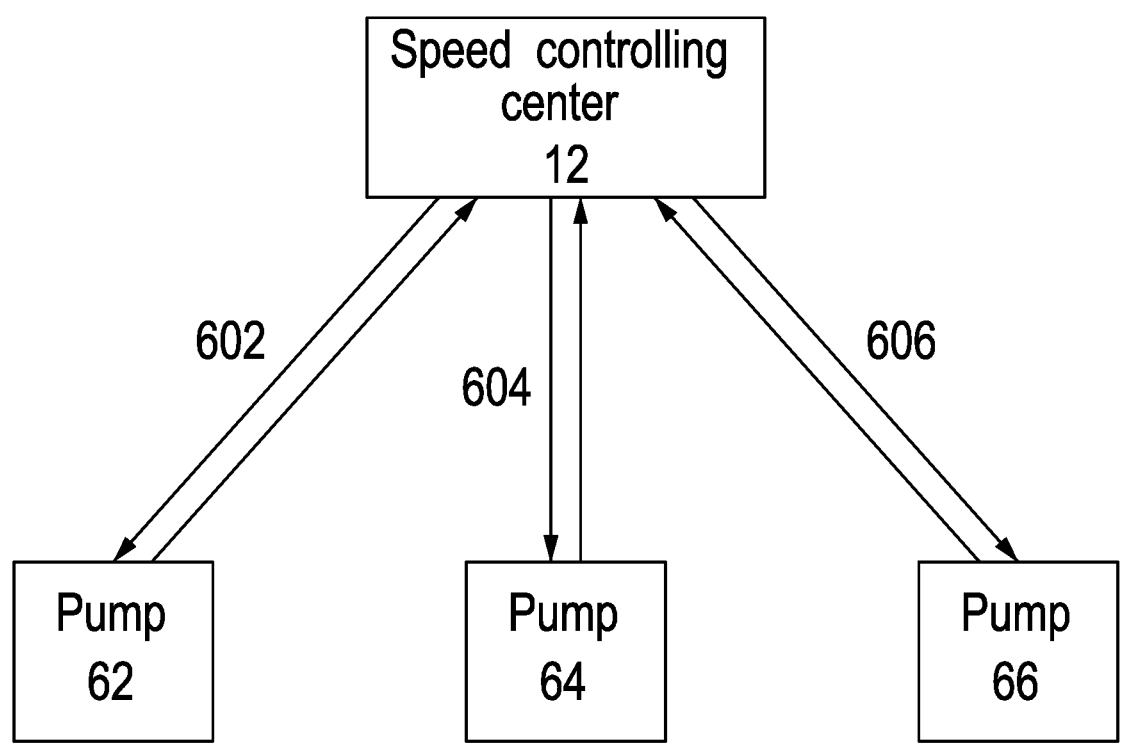
FIG. 7 is a schematic illustration of a pumping system involving a speed controlling center coupled to a plurality of pumps.

Referring to FIG. 7 and in accordance with the present invention, a systematic view of the pumping controlling system including the above-mentioned speed controlling apparatus is presented. More particularly, the pumping system includes a speed controlling center 12 which controls a plurality of pumps or pumping systems 62, 64 and 66 which are illustrated in FIG. 7. According to the present invention, the output unit and the input unit of the speed controlling center 12 are connected to the input unit and the output unit of the plurality of pumps 62, 64 and 66, respectively. The speed controlling center 12 can be located either at the same site as at least one of the plurality of pumps or pumping systems, in which case at least of the connections 602, 604 and 606 between the output/input units of the speed controlling center 12 and the plurality of the pumps are physical cables with a transmission rate capable of handling the transmissions therebetween depending on the application scenario and requirements. It is thus also possible that the speed control center 12 is located in another site different from one or more or all of the pumps or pumping systems, in which case one or more or all of the connections therebetween are implemented through wireless communication. Therefore, not only is a centralized local controlling network of the pump speed centered around a speed controlling center 12 is possible in accordance with the present invention, a decentralized pump speed controlling system is achievable wherein the speed control center 12 is capable of controlling simultaneously at least one pumps or pumping systems resulting in an even higher efficiency of the controlling method and a reduction in demand of physical apparatus of speed controlling.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method for controlling a speed of a Variable Speed Drive, (VSD) vacuum pump employed in a cyclic application, comprising:
    controlling the pump to operate in repeated cycles, each cycle comprising a pump down phase and a holding phase, wherein each cycle starts at a time point when a rise in an inlet pressure of the pump reaches a preset threshold and the time between two consecutive cycle starts is a cycle time;
    determining, during a present cycle, a start of a next cycle, wherein the present cycle directly precedes the next cycle;
    estimating pre-speeding time of the next cycle based on an estimation of the pre-speeding time determined for the present cycle and an observation of the pre-speeding time of the present cycle, each pre-speeding time referring to a length of time since a respective start of a respective cycle until a time point in the holding phase of the respective cycle when the pump is controlled to speed up; and
    controlling the pump to speed up to a maximum speed during the holding phase of the next cycle at the end of the estimate of the pre-speeding time of the next cycle before the start of a cycle after the next cycle such that at the start of the cycle after the next cycle full pump capacity is available.

2. The method according to claim 1, wherein
in the pump down phase, the pump is controlled to operate at a maximum speed such that a volume is pumped down from a high pressure to a setpoint pressure.

3. The method according to claim 2, wherein
in the holding phase, the pump is controlled to slow down to a lowest speed such that the setpoint pressure is kept.

4. The method according to claim 3, wherein in the holding phase, the speed of the pump is controlled to decrease on the basis of the inlet pressure and the setpoint pressure.

5. The method according to claim 1, wherein the method further comprises
    detecting the start of each cycle upon detecting that the inlet pressure reaches the preset threshold.

6. The method according to claim 1, wherein
the start of the next cycle is estimated by a Bayesian Filter on the basis of the start of at least one previous cycle preceding the next cycle.

7. The method according to claim 6, wherein
the inlet pressure is estimated by applying a Kalman filter on the derivative over time of the inlet pressure based on:
    predicting, a priori, the derivative over time of the inlet pressure in the next cycle on the basis of an estimation of the derivative over time of the inlet pressure in the at least one previous cycle preceding the next cycle; and
    updating, a posteriori, the derivative over time of the inlet pressure in the next cycle on the basis of the a priori prediction of the derivative over time of the inlet pressure in the next cycle and an observation of the derivative over time of the inlet pressure in the present cycle, wherein
    by observation it is referred to a measured value and by estimation it is referred to an updated prediction based on observation.

8. The method according to claim 1, wherein estimating the pre-speeding time of the next cycle comprises using a Bayesian Filter.

9. The method according to claim 8, wherein
the estimation of the pre-speeding time of the next cycle is a weighted average of the estimation of the pre-speeding time of the present cycle and the observation of the pre-speeding time of the present cycle.

10. The method according to claim 9, wherein the method further comprises estimating the pre-speeding time of the next cycle based on an iterative learning formula, $$u_{j+1} = \frac{a}{a+b+c+d}*u_j + \frac{b}{a+b+c+d}*u_{j-1} + \frac{c}{a+b+c+d}*u_{j-2} + \frac{d}{a+b+c+d}*\left(CycleTime_j - \frac{\text{Max Speed} - \text{Min Speed}}{\text{Acceleration}} - \text{offset}\right),$$

wherein:
- j=the iteration index for the present cycle,
- u=the estimation of the pre-speeding time,
- a=weighting factor,
- b=weighting factor,
- c=weighting factor,
- d=weighting factor,
- CycleTime=the observation of the cycle time,
- Acceleration=the acceleration constant in revolution per minute per second,
- rpm/s, used in a VSD inverter, and
- offset=offset parameter to increase stability.

11. The method according to claim 1, wherein the method further comprises controlling the pump to operate at the maximum speed for at least one cycle when the controlling method is run for the first time such that the start time point and/or the pre-speeding time of the at least one cycle is obtained.

12. An apparatus for controlling a speed of a pump, in particular a Variable Speed Drive (VSD) vacuum pump employed in a cyclic application, comprising:
- a memory unit comprising instructions in respect of the steps of the method of claim 1;
- a processing unit configured to execute the instructions comprised in the memory unit;
- an output unit configured to transmit speed controlling signals to the pump; and
- an input unit configured to read and feed the inlet pressure of the pump to the processing unit.

13. The apparatus according to claim 12, wherein the apparatus further comprises a time counting unit configured to calculate the start time point and/or the pre-speeding time of at least one cycle when the processing unit starts executing the instructions for the first time.

14. The apparatus according to claim 13, wherein
the time counting unit is further configured to measure the start time point and/or the cycle time of the present cycle.

15. A Variable Speed Drive (VSD) vacuum pump employed in a cyclic application, coupled to an apparatus for controlling the speed of the pump, comprising
- a control unit configured to detect a plurality of pump parameters;
- an output unit configured to transmit the plurality of pump parameters to the speed controlling apparatus; and
- an input unit configured to receive speed controlling signals transmitted from the speed controlling apparatus such that the pump is controlled to operate according to claim 1.

16. The pump according to claim 15, wherein
the plurality of pump parameters comprises the inlet pressure of the pump.

17. A non-transitory computer-readable medium having computer-executable instructions for performing the method of claim 1.

* * * * *